United States Patent Office 3,315,700
Patented Apr. 25, 1967

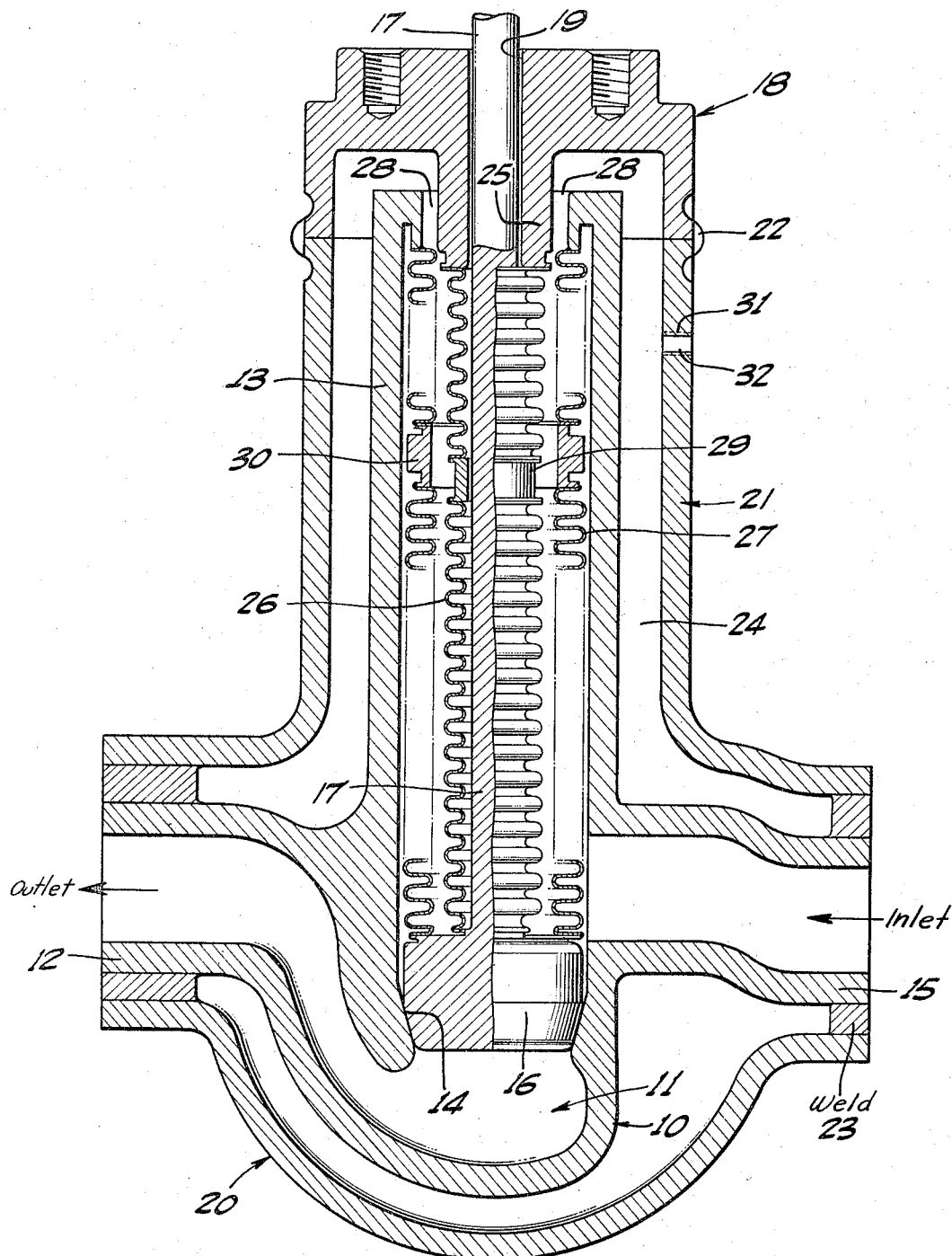

3,315,700
TUBULAR JACKETED DOUBLE BELLOWS VALVE
Eugene C. Greenwood, 413 Poinsettia,
Corona del Mar, Calif. 92625
Filed Feb. 3, 1964, Ser. No. 342,211
4 Claims. (Cl. 137—375)

This invention relates to valves for the control of fluids operating under extreme temperature or pressure conditions.

Valves for the control of fluids under extreme conditions of temperature and pressure are known and widely used. In such valves it is common for the valve structure to be so made as to provide a closed chamber around the valve body, which chamber is maintained at a vacuum or high pressure with respect to the pressure of the main fluid flow so as to prevent escape of the main fluid stream. In such valves it is conventional to use steel bellows in lieu of sliding packing, and it is also conventional to use a double bellows designed to provide a double containment and provide a vacuum in the outer chamber, such as for valving cold fluids, for example liquid hydrogen.

In the conventional type of valve construction the two bellows are positioned substantially end to end, and this arrangement is unsatisfactory under many conditions of use. In the present invention the two bellows are concentric, i.e., doubled back one on the other. By this arrangement one of the bellows controls the active fluid and the other one controls the vacuum chamber surrounding the valve body.

It is therefore an object of the invention to provide a jacketed valve with improved means for preventing escape or contamination of the active fluid.

Another object of the invention is to provide a jacketed valve of improved construction for the control of volatile fluids under extreme conditions of temperature and pressure.

An additional object of the invention is to provide a valve as in the previous objects incorporating a double seal of the bellows type.

A further object of the invention is to provide a jacketed valve for the control of fluids containing radioactive material wherein a vacuum level is provided in the outer jacket of the valve body.

Other objects and advantages of the invention will appear and be brought out more fully in the following specification, reference being had to the accompanying drawing. In the drawing the figure is a view in central section of a valve embodying the present invention.

Referring more particularly to the drawing the valve of this invention is formed with a main body 10, a valve chamber 11 which communicates directly with a neck 12 to which an inlet or outlet pipe may be connected. The valve body 10 is formed with a cylindrical extension 13 and a valve seat 14 is formed between extension 13 and valve chamber 11. The valve body is also formed with a neck 15 similar to neck 12 for connection to a supply or discharge pipe. Neck 15 opens into chamber 13 above the valve seat 14.

A valve member 16 is secured on the end of a piston rod 17 which extends upwardly and out of cylinder 13 and is adapted for connection to a suitable valve actuator not shown. A cylinder head 18 is secured on the upper end of cylinder 13 and is formed with a bore 19 through which piston rod 17 extends.

A shell 20 surrounds valve body 10 and necks 12 and 15 and a shell 21 surrounds cylinder 13 and is suitably joined as by welding 22 to cylinder head 18. The shell 21 is secured as by welding 23 to necks 12 and 15, thus forming a chamber 24 which is seen to completely surround the valve body 10 and cylinder 13. Cylinder head 18 has an internal annular extension 25 and a bellows 26 has its ends respectively secured and sealed to extension 25 and valve member 16. Bellows 26 thus surrounds the piston rod 17. A bellows 27 surrounds bellows 26 and has its ends respectively secured to valve member 16 and extension 25 of cylinder head 18, and it will be observed that there is an annular space between the two bellows. A plurality of ports 28 are formed in extension 25 to provide a communication for pressure equalization between the space between the bellows and the chamber 24. Bellows stabilizers 29 and 30 may be provided if desired to insure proper action of the bellows. A bore 31 is formed in the wall of cylinder 21 and fitted with a suitable plug 32 to provide access to chamber 24.

The operation of the invention should be clear from the foregoing description. When valve member 16 is seated on seat 14 fluid from neck 15, assuming it is the inlet connection, is prevented by bellows 27 from reaching chamber 24. Leakage from chamber 24 to the atmosphere by way of bore 19 in cylinder head 18 is prevented by bellows 26. Thus the main flow between necks 15 and 12 is kept separate from the fluid or vacuum maintained in the chamber 24.

As an example, clean helium may be maintained in chamber 24 at 475 p.s.i. when dirty helium at 470 p.s.i. is conducted through and controlled by valve 16. If the main flow is to be heated, chamber 24 can be supplied with steam. Conversely, if the main flow is a fluid at low temperature, chamber 24 may be operated at a vacuum to cool the valve body 10. Additionally, if the main flow is a fluid having radioactive material therein chamber 24 may be maintained at a vacuum.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:
1. A valve comprising a valve body having inlet and outlet chambers and a valve seat therebetween, a valve member movable toward and away from said seat, a cylinder communicating with one of said chambers, a piston rod for said valve member reciprocable in said cylinder, a bellows surrounding said piston rod having its ends sealed to said valve and the remote end of said cylinder, a static chamber surrounding said cylinder and valve chambers communicating with said cylinder, a second bellows surrounding said first bellows in spaced relation thereto, there being a port in said cylinder interconnecting said static chamber and the space between said bellows.

2. A valve comprising a valve body having inlet and outlet chambers and a valve seat therebetween, a valve member movable toward and away from said seat, a cylinder communicating with one of said chambers, a piston rod for said valve member reciprocable in said cylinder, a bellows surrounding said piston rod having its ends sealed to said valve and the remote end of said cylinder, a vacuum chamber surrounding said cylinder and valve chambers communicating with said cylinder, a second bellows surrounding said first bellows in spaced relation thereto, there being a port in said cylinder interconnecting said vacuum chamber and the space between said bellows.

3. A valve comprising a valve body having inlet and outlet chambers and a valve seat therebetween, a valve member movable toward and away from said seat, a cylinder communicating with one of said chambers, a piston rod for said valve member reciprocable in said cylinder, a pair of bellows surrounding said piston rod having the ends thereof, respectively, sealed to said valve and the remote end of said cylinder, a static chamber surrounding said cylinder and valve chambers communicating with said cylinder, there being a port in said cylinder interconnecting said static chamber and the space between said bellows.

4. A valve comprising a valve body having inlet and outlet chambers and a valve seat therebetween, a valve member movable toward and away from said seat, a cylinder communicating with one of said chambers, a piston rod for said valve member reciprocable in said cylinder, a bellows surrounding said piston rod having its ends sealed to said valve and the remote end of said cylinder, a static chamber surrounding said cylinder and valve chambers communicating with said cylinder, a second bellows surrounding said first bellows in spaced relation thereto, and port means providing an interconnection between said static chamber and the space between said bellows.

References Cited by the Examiner
UNITED STATES PATENTS

| | | | |
|---|---|---|---|
| 1,779,503 | 10/1930 | Swindin | 137—375 |
| 2,691,773 | 10/1954 | Lichtenberger. | |
| 2,831,326 | 4/1958 | Richards et al. | 137—375 X |
| 2,880,620 | 4/1959 | Bredtschneider | 251—335 X |

H. CARY NELSON, *Primary Examiner.*

H. KLINKSIEK, *Assistant Examiner.*